(12) United States Patent
Howe

(10) Patent No.: US 9,413,802 B2
(45) Date of Patent: Aug. 9, 2016

(54) ADAPTIVE MULTICASTING

(75) Inventor: Jeffrey Joseph Howe, West Chicago, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 374 days.

(21) Appl. No.: 13/220,067

(22) Filed: Aug. 29, 2011

(65) Prior Publication Data

US 2013/0051387 A1 Feb. 28, 2013

(51) Int. Cl.
H04L 12/18 (2006.01)
H04L 29/06 (2006.01)
H04L 12/801 (2013.01)
H04L 12/835 (2013.01)

(52) U.S. Cl.
CPC .......... H04L 65/605 (2013.01); H04L 12/1854 (2013.01); H04L 12/1863 (2013.01); H04L 47/15 (2013.01); H04L 65/4076 (2013.01); H04L 65/80 (2013.01); H04L 69/14 (2013.01); H04L 47/11 (2013.01); H04L 47/30 (2013.01); H04L 47/34 (2013.01); Y02B 60/33 (2013.01)

(58) Field of Classification Search
CPC ... H04L 12/18; H04L 2012/64; H04L 65/605; H04L 47/15; H04L 12/1854; H04W 72/04; H04W 72/0446
USPC ......... 370/390, 252, 329, 352, 312, 330, 343, 370/344, 345, 347, 348; 455/509, 67.11
See application file for complete search history.

(56) References Cited

U.S. PATENT DOCUMENTS

| 2006/0120282 | A1* | 6/2006 | Carlson et al. ............... 370/229 |
| 2007/0076759 | A1* | 4/2007 | Kim et al. ..................... 370/476 |
| 2009/0129775 | A1* | 5/2009 | Handelman .................... 398/47 |
| 2012/0198506 | A1* | 8/2012 | Joe et al. ....................... 725/97 |

FOREIGN PATENT DOCUMENTS

EP 2046041 A1 * 4/2009

* cited by examiner

Primary Examiner — Chiho Lee
(74) Attorney, Agent, or Firm — Stewart M. Wiener

(57) ABSTRACT

Methods and apparatuses for adaptively multicasting information from a server to a multicast group are provided. A multicast transmission along one or more paths of the transmission is changed as network conditions warrant.

17 Claims, 4 Drawing Sheets

ADAPTIVE MULTICASTING

TECHNICAL FIELD

This disclosure relates to adaptive multicasting.

BACKGROUND

Multicast transmissions can be used to deliver a service (e.g., IPTV) from a source to a designated group of recipients ("multicast group") over a networked environment. The multicast information comprising the service is transmitted from the source once and then copied by network elements (e.g., routers at branches in the network) to deliver the information to each of the recipients in the multicast group. For example, to multicast streaming video from a server to a multicast group serviced by one or more access routers, the server delivers one copy of the streaming video over a network to the access routers. Each of the access routers then copies the streaming video and transmits the streaming video on each path serviced by the access router that reaches a portion of the multicast group. In this way, the portion of the multicast group serviced by an access router will receive the streaming video.

However, congestion control mechanisms are limited for multicast transmissions. Thus, since all recipients in a multicast group receive multicast information addressed to the multicast group at the same bitrate, if a path serviced by an access router that reaches a portion of the multicast group becomes congested, recipients of the portion of the multicast group reached by the congested path can experience service degradation due to packet loss.

DETAILED DESCRIPTION

Various implementations of this disclosure adapt a multicast transmission along one or more paths of the transmission as network conditions warrant. It should be understood that this disclosure is not intended to be limited to any particular multicasting technology. The concepts disclosed herein can be applied to any existing or future developed multicast technology.

Figure 1:
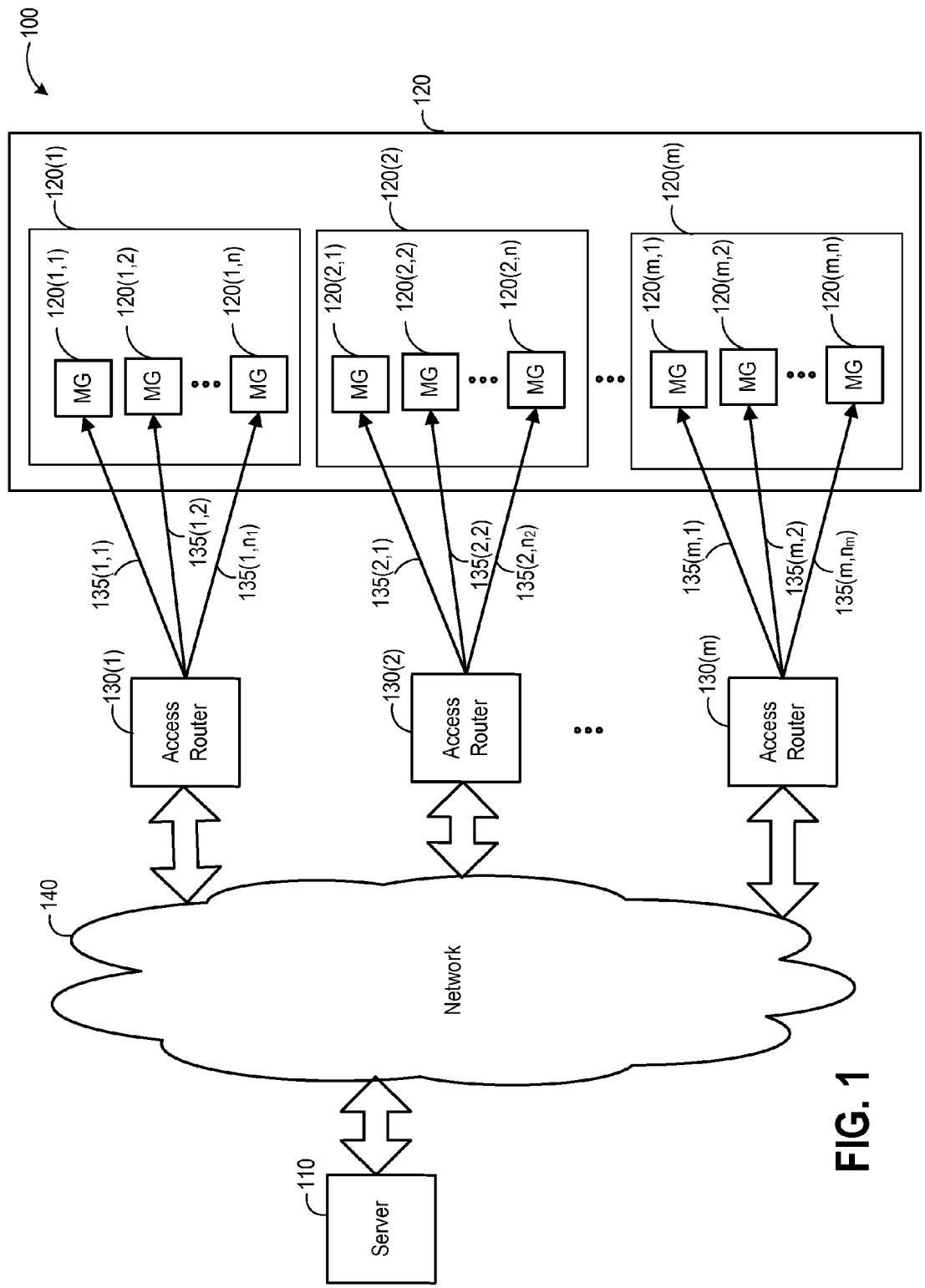
FIG. 1 is a block diagram illustrating an example existing system for multicasting information from a server to a multicast group.

FIG. 1 illustrates an example system 100 for transmitting multicast information from a server 110 to a multicast group 120. In some implementations, the multicast information can be streaming information in one of a number of different real-time protocols, and can include any of video, audio or computer data. A single copy of the multicast information is transmitted from the server 110 over a network 140 to each of one or more access routers 130($i$), i=1, . . . , m, that service the multicast group 120. The multicast information can also include address information identifying the multicast group 120 to which the multicast information is intended to be transmitted.

Based upon the address information included with the multicast information, the receiving access routers 130($i$), i=1, . . . , m can identify the recipients 120 of the multicast information. Each of the access routers 130($i$), i=1, . . . , m, then copies the information and transmits a copy of the information on each path 135($i$, $j$), j=1, . . . , $n_i$, serviced by the access router 130($i$) that reaches a portion of the multicast group 120($i$). In this way, the portion of the multicast group 120($i$) serviced by an access router 130($i$) will receive the multicast information (e.g., streaming video signal).

In various implementations, the network 140 can be any of a single integrated network or a set of separate independent networks. Additionally, the network can be any type of wired or wireless network or a combination thereof. In some implementations, part of the system 100 can be a cable network. For example, each of the access routers 130($i$), i=1, . . . , m can be a cable modem termination system (CMTS) or converge edge router (CER), and paths 135($i$, $j$) i=1, . . . , m, j=1, . . . , $n_i$ can take the form of an all-coax, all-fiber, or hybrid fiber/coax (HFC) network. However, it should be understood that this disclosure is not limited to any particular system or network.

As mentioned above, congestion control mechanisms are limited for multicast transmissions. Moreover, multicast information is transmitted at the same bitrate to all recipients in a multicast group (e.g., multicast group 120). Because all recipients in a multicast group receive multicast information addressed to the multicast group at the same bitrate, if a path (e.g., path 135(1, 1)) serviced by an access router (e.g., 130(1)) becomes congested, for example, recipients of the portion of the multicast group reached by the congested path can experience service degradation. Service degradation can include packet loss, jitter, etc. Thus, in some implementations, it can be desirable to adapt a multicast transmission along a path of the transmission as network conditions warrant.

Figure 2:
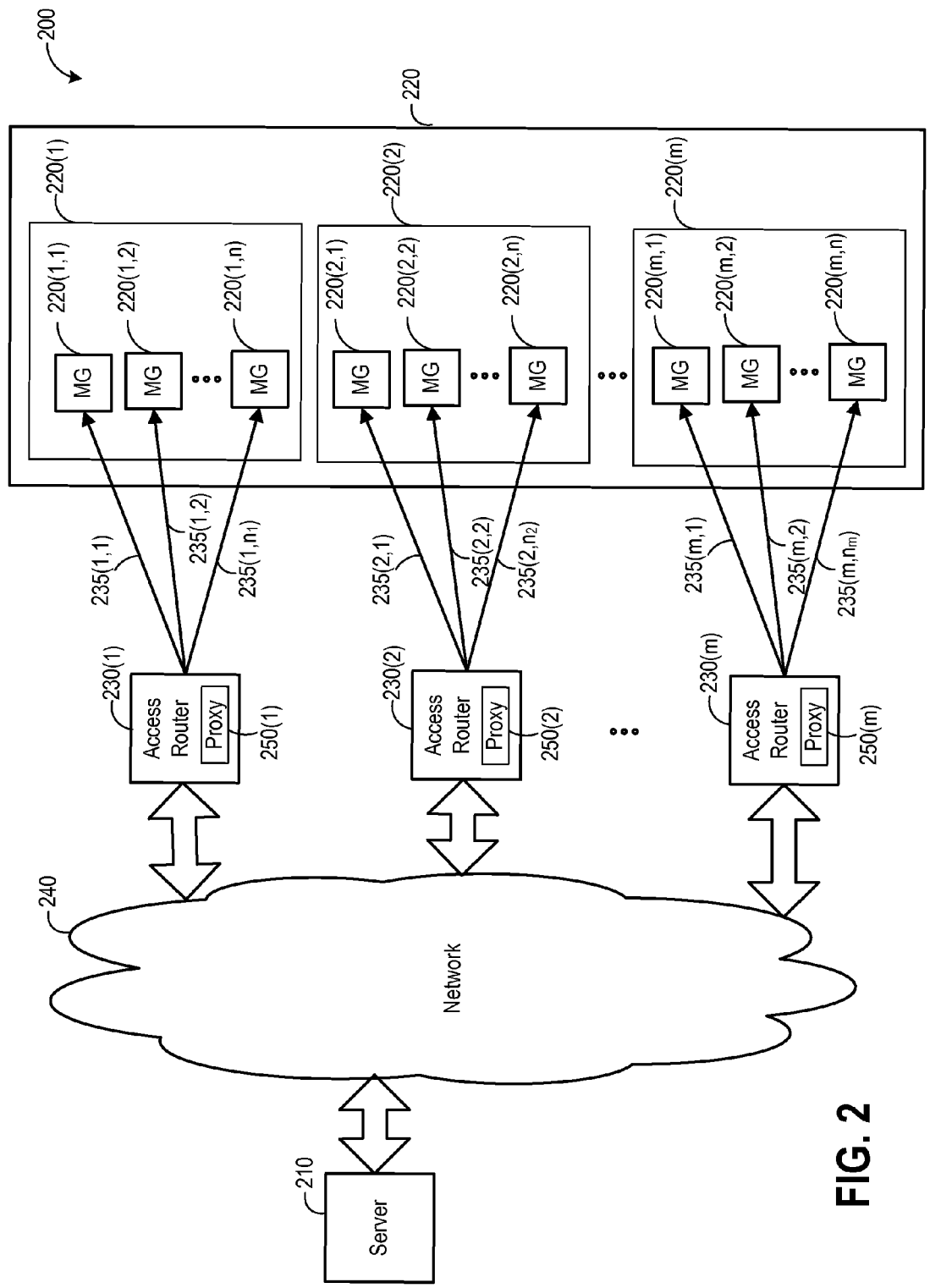
FIG. 2 is a block diagram illustrating an example implementation of an improved system for multicasting information from a server to a multicast group.

FIG. 2 illustrates an example implementation of an improved system 200 for transmitting multicast information from a server 210 to a multicast group 220.

In some implementations, each of the access routers 230($i$), i=1, . . . , m can include a proxy 250($i$). The proxy 250($i$) can determine the condition of the paths 235($i$, $j$), j=1, . . . , $n_i$, serviced by the access router 230($i$) that reaches a portion of the multicast group 220($i$,$j$). If a proxy (e.g., proxy 250(1)) determines that a path (e.g., path 235(1,1)) is congested, for example, the proxy can transmit the multicast information on the congested path at a lower bitrate. In one implementation, the proxy can request the multicast information at the lower bitrate from the server. In another implementation, the server can transmit the multicast data at the second bitrate to the access routers where each proxy determines for each corresponding path which version of the multicast information to transmit based on network conditions. In another implementation, a proxy could transcode/transrate the information into a lower bitrate to transmit on the congested path(s).

It is noted that a path 235($i$, $j$), j=1, . . . , $n_i$, can be a physical path and/or logical path (e.g., channels). The term path is intended to be construed broadly and covers any physical or logical path from an access router to a portion of a multicast group.

Figure 3:
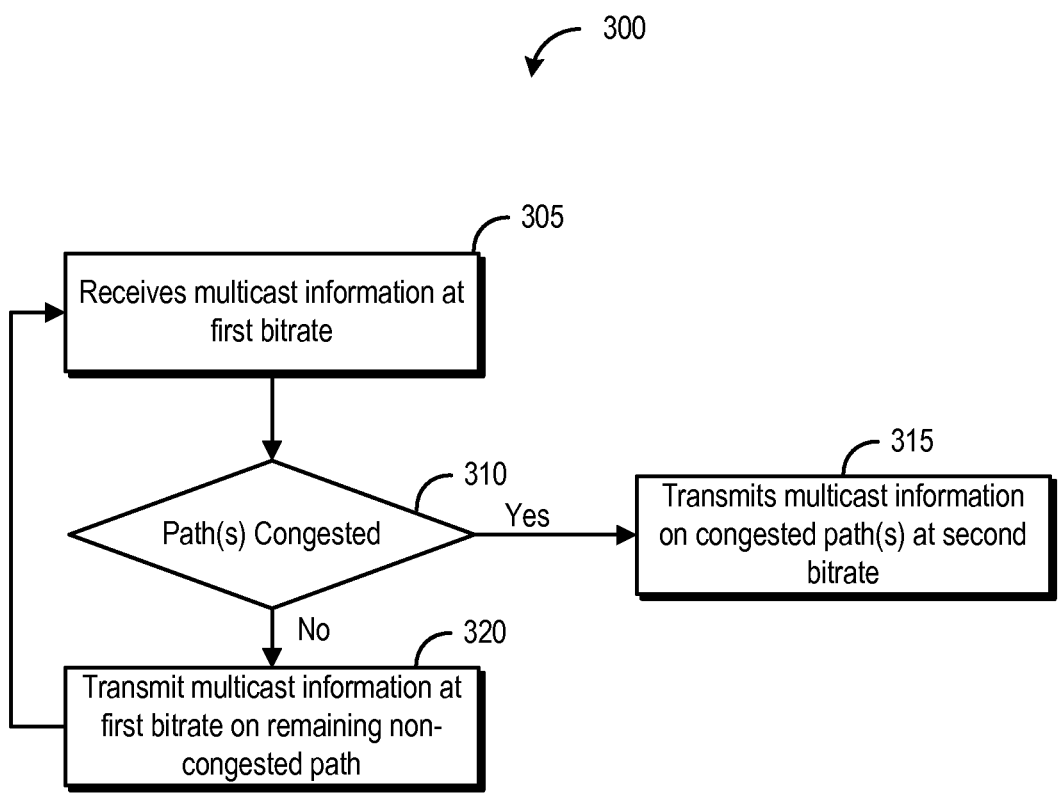
FIG. 3 is a flowchart illustrating an example processes for multicasting information from a server to a multicast group.

FIG. 3 illustrates an example process 300 for transmitting streaming multicast data from a server to a multicast group.

At stage 305, an access router (e.g., access router 230(1,1) of FIG. 2) receives multicast data addressed to a multicast group (e.g., multicast group 220 of FIG. 2) from a server (e.g., server 210 of FIG. 2) at a first bitrate. In various implementations, the first bitrate can be set by a source of the multicast data, or by a server (e.g., server 210) originating the multicast transmission.

At stage 310, a determination is made whether a path that reaches a portion of the multicast group is congested. The determination can be made, for example by an access router. Thus, the access router can determine whether a path serviced by the access router that reaches a portion of the multicast group is congested. This determination can be based on the amount of packet loss on a path, link utilization, and/or queue depth, for example. One of ordinary skill in the art understands how to determine whether a path serviced by an access router is congested. This disclosure is not limited to any particular method for determining whether a path serviced by an access router is congested. Any existing or future developed method for determining whether a path serviced by an access router is congested is intended to be included within the scope of this disclosure. This determination can be made concurrently with stage 305.

If a path (e.g., path 235(1,1)) is congested ("Yes" at stage 310), the multicast data can be transmitted on the path at a second bitrate that is lower than the first bitrate at stage 315. The multicast data can be transmitted, for example, by the access router servicing the multicast group over the congested path. In one implementation, the access router can request the multicast data at the second rate from the server. In another implementation, the server can multicast the multicast data at the second bitrate.

At stage 320, the multicast data is transmitted on each of the remaining non-congested paths (e.g., paths 235(1,2), . . . , 235(2,$n_1$)) at the first bitrate. The multicast data can be transmitted, for example, by an access router that services a portion of the multicast group at the first bitrate. In this way, for example, streaming video can be adaptively multicast from a server to a multicast group serviced by one or more access routers based on network conditions.

While processes are illustrated as stages performed in a particular order, such processes are not required to be performed in the particular order shown or in sequential order (e.g., the stages can be implemented in parallel).

Figure 4:
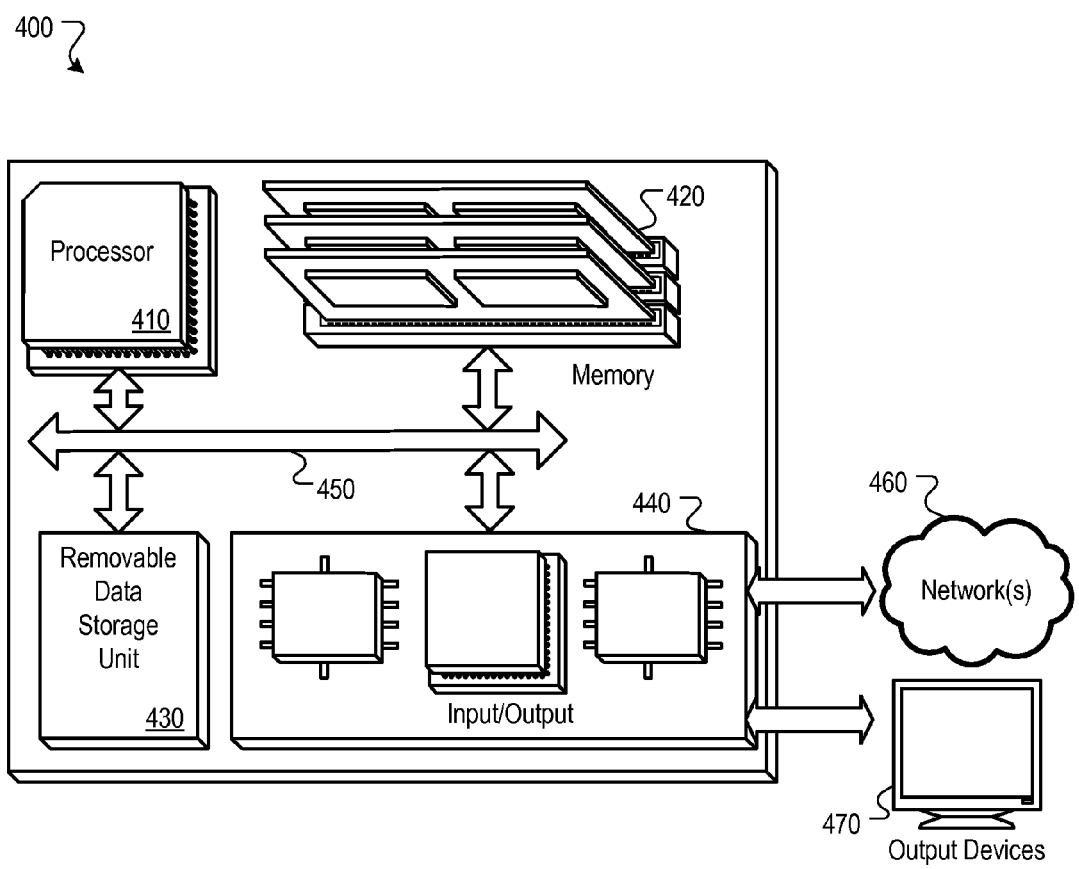
FIG. 4 is a block diagram illustrating an example broadband communications device operable to perform the example processes of FIG. 3.

FIG. 4 illustrates an example access router 230($i$) operable to perform the example process 300 of FIG. 3.

The access router can include a processor 410, a memory 420, a removable data storage unit 430, and an input/output device 440. Each of the components 410, 420, 430, and 440 can, for example, be interconnected using a system bus 450. The processor 410 is capable of processing instructions for execution within the access router. For example, the processor 410 can be capable of processing instructions for executing the process 300 of FIG. 3. In some implementations, the processor 410 is a single-threaded processor. In other implementations, the processor 410 is a multi-threaded processor. The processor 410 is capable of processing instructions stored in the memory 420 or on the storage device 430.

The memory 420 stores information within the access router. In some implementations, the memory 420 is a computer-readable medium. In other implementations, the memory 420 is a volatile memory unit. In still other implementations, the memory 420 is a non-volatile memory unit.

Implementations of the devices of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A computer-implemented method for multicasting information, comprising:
   receiving at an access router multicast information for a multicast session encoded at a first bitrate wherein the information is addressed to a multicast group;
   transmitting the multicast information encoded at the first bitrate to a first portion of the multicast group serviced by the access router, wherein the transmitting is on a first set of paths serviced by the access router that reaches the first portion of the multicast group, and wherein the first set of paths comprises one or more paths serviced by the access router; and
   transmitting the multicast information encoded at a second bitrate to a second portion of the multicast group serviced by the access router, the second bitrate lower than the first bitrate, wherein the transmitting is on a second set of paths serviced by the access router that reaches a second portion of the multicast group different from the first portion of the multicast group, and wherein the second set of paths comprises one or more paths serviced by the access router.

2. The method of claim 1 further comprising receiving at the access router the multicast information encoded at a second bitrate.

3. The method of claim 1 further comprising generating the multicast information encoded at the second bitrate from the multicast information encoded at the first bitrate.

4. The method of claim 3 wherein generating the multicast information encoded at the second bitrate from the multicast information encoded at the first bitrate comprises transcoding the received multicast information encoded at the first bitrate.

5. The method of claim 3 wherein generating the multicast information encoded at the second bitrate from the multicast information encoded at the first bitrate comprises translating the information.

6. The method of claim 1 wherein the first set of paths comprises one or more logical channels serviced by the access router and the second set of paths comprises one or more logical channels serviced by the access router.

7. The method of claim 1 wherein the first set of paths comprises one or more fiber links serviced by the access router and the second set of paths comprises one or more fiber links serviced by the access router.

8. The method of claim 1 wherein the second set of paths includes one or more congested paths and the second bitrate is lower than the first bitrate.

9. The method of claim 1 wherein the access router is a CMTS.

10. The method of claim 1 wherein the multicast information is streaming video.

11. The method of claim 2 further comprising requesting the multicast information at the second bitrate from a server.

12. The method of claim 2 further comprising automatically receiving the multicast information at the second bitrate.

13. An adaptive multicasting system, comprising:
   means for receiving at an access router information at a first bitrate wherein the information is addressed to a multicast group;
   means for transmitting the information at the first bitrate to a first portion of the multicast group serviced by the access router, wherein the transmitting is on a first set of paths serviced by the access router that reaches the first portion of the multicast group, and wherein the first set of paths comprises one or more paths serviced by the access router; and
   means for transmitting the information at a second bitrate to a second portion of the multicast group serviced by the access router, the second bitrate lower than the first bitrate, wherein the transmitting is on a second set of paths serviced by the access router that reaches a second portion of the multicast group different from the first portion of the multicast group, and wherein the second set of paths comprises one or more paths serviced by the access router.

14. The system of claim 13 further comprising means for receiving at the access router the information at a second bitrate.

15. The system of claim 13 further comprising means for generating the information at the second bitrate from the information at the first bitrate.

16. A system for multicasting information, comprising:
   an access router configured to receive information at a first bitrate wherein the information is addressed to a multicast group serviced by the access router, the multicast group comprising at least a first portion of the multicast group serviced by the access router and a second portion of the multicast group different from the first portion of the multicast group; and
   a proxy configured to determine whether a path serviced by the access router that reaches the first portion of the multicast group is congested;
   wherein the access router is configured to transmit the information on the path, based on the proxy determination, at the first bitrate or at a second bitrate that is lower than the first bitrate.

17. One or more non-transitory computer readable media having instructions operable to cause a computer to execute an adaptive multicasting method, the method comprising:
   in an access router configured to receive a multicast transmission at a first bitrate, wherein the multicast transmission is addressed to a multicast group serviced by the access router:
      determining, for a selected path of a plurality of paths serviced by the access router, wherein the selected path reaches a portion of a plurality of portions of the multicast group serviced by the access router, whether the selected path is congested; and
      determining a bitrate, selected from a group consisting of the first bitrate and a second bitrate lower than the first bitrate, at which to transmit the multicast transmission on the selected path, based on the first determining step.

* * * * *